(No Model.) 3 Sheets—Sheet 1.
N. TESLA.
SYSTEM OF ELECTRICAL DISTRIBUTION.
No. 390,413. Patented Oct. 2, 1888.
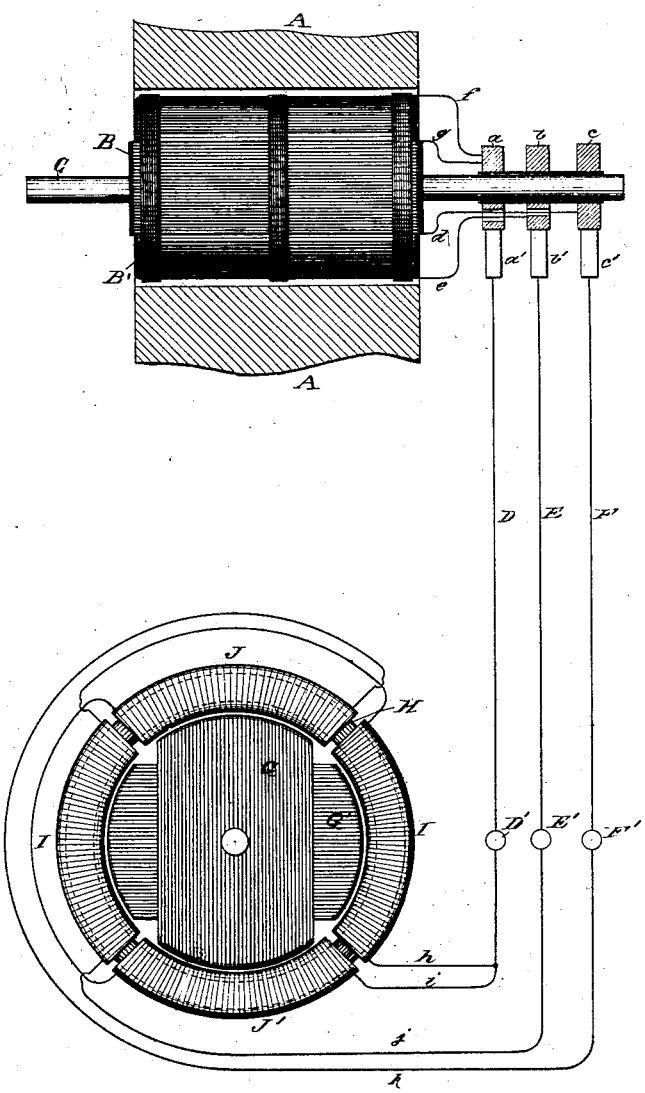
WITNESSES:
Raphael Netter
Frank B. Murphy
INVENTOR
Nikola Tesla
BY Duncan, Curtis & Page
ATTORNEY

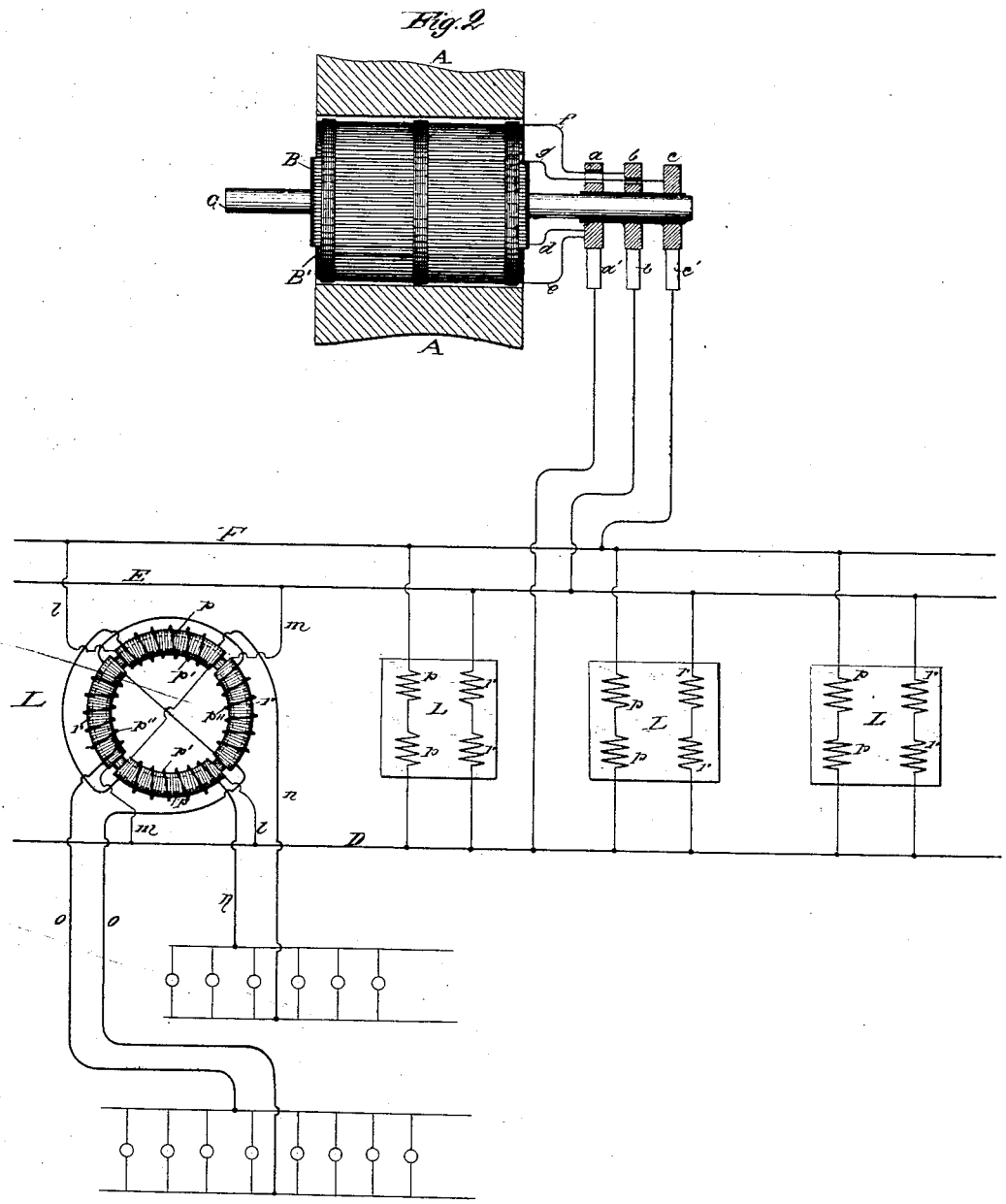

(No Model.) 3 Sheets—Sheet 3.
N. TESLA.
SYSTEM OF ELECTRICAL DISTRIBUTION.
No. 390,413. Patented Oct. 2, 1888.
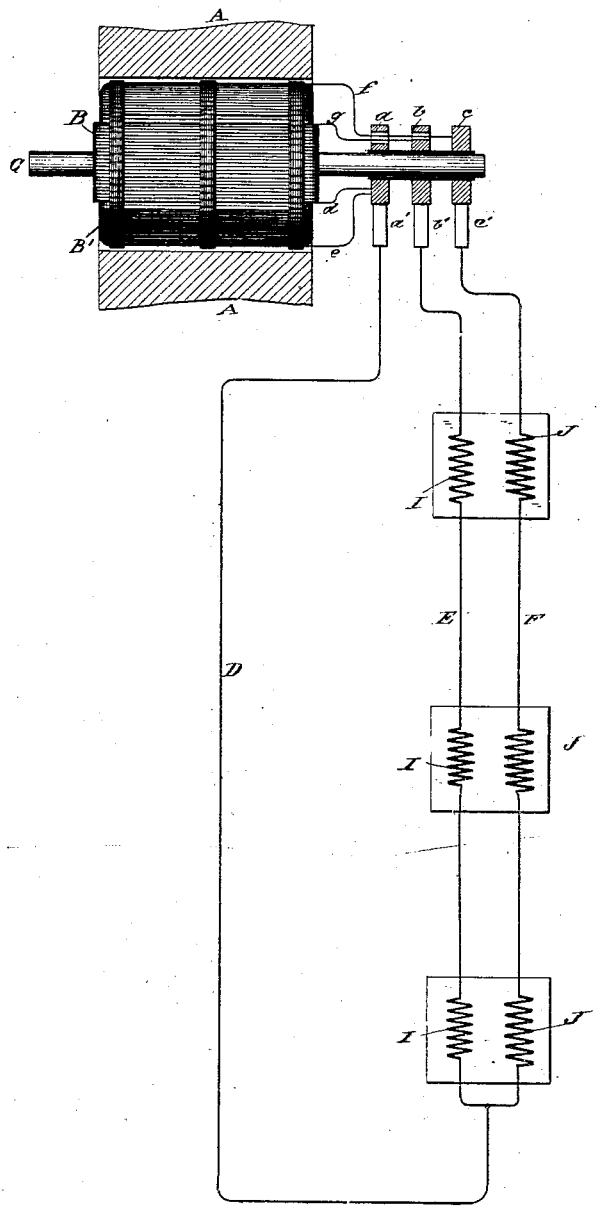
WITNESSES:
Raphael Netter
Frank B. Murphy
INVENTOR
Nikola Tesla
BY
Duncan, Curtis & Page.
ATTORNEYS.

UNITED STATES PATENT OFFICE.

NIKOLA TESLA, OF NEW YORK, N. Y., ASSIGNOR TO THE TESLA ELECTRIC COMPANY, OF SAME PLACE.

SYSTEM OF ELECTRICAL DISTRIBUTION.

SPECIFICATION forming part of Letters Patent No. 390,413, dated October 2, 1888.

Application filed April 10, 1888. Serial No. 270,187. (No model.)

*To all whom it may concern:*

Be it known that I, NIKOLA TESLA, a subject of the Emperor of Austria, from Smiljan, Lika, border country of Austria-Hungary, residing in the city, county, and State of New York, have invented certain new and useful Improvements in Systems of Electrical Distribution, of which the following is a specification, reference being had to the drawings accompanying and forming a part of the same.

In previous applications for patents made by me I have shown and described electrical systems for the transmission of power and the conversion and distribution of electrical energy, in which the motors and the transformers contain two or more coils or sets of coils, which were connected up in independent circuits with corresponding coils of an alternating-current generator, the operation of the system being brought about by the co-operation of the alternating currents in the independent circuits in progressively moving or shifting the poles or points of maximum magnetic effect of the motors or converters. In these systems, as I have described them, two independent conductors were employed for each of the independent circuits connecting the generator with the devices for converting the transmitted currents into mechanical energy or into electric currents of another character; but I have found that this is not always necessary, and that the two or more circuits may have a single return path or wire in common, with a loss, if any, which is so extremely slight that it may be disregarded entirely. For sake of illustration, if the generator have two independent coils and the motor two coils or two sets of coils in corresponding relations to its operative elements one terminal of each generator-coil is connected to the corresponding terminals of the motor coils through two independent conductors, while the opposite terminals of the respective coils are both connected to one return-wire.

This invention is applicable to my system in various ways, as will be seen by reference to the drawings, in which—

Figure 1 is a diagrammatic illustration of a generator and single motor constructed and electrically connected in accordance with the invention. Fig. 2 is a diagram of the system as it is used in operating motors or converters, or both, in parallel or multiple arc. Fig. 3 illustrates diagrammatically the manner of operating two or more motors or converters, or both, in series.

It is obvious that for purposes of this invention motors or transformers, which may be all designated as "converters," are the same, and that either or both may be operated by the same system or arrangement of circuits.

Referring to Fig. 1, A A designate the poles of the field-magnets of an alternating-current generator, the armature of which, being in this case cylindrical in form and mounted on a shaft, C, is wound longitudinally with coils B B'. The shaft C carries three insulated contact-rings, $a\ b\ c$, to two of which, as $b\ c$, one terminal of each coil, as $e\ d$, is connected. The remaining terminals, $f\ g$, are both connected to the third ring, $a$.

A motor in this case is shown as composed of a ring, H, wound with four coils, I I J J, electrically connected, so as to co-operate in pairs, with a tendency to fix the poles of the ring at four points ninety degrees apart. Within the magnetic ring H is a disk or cylindrical core wound with two coils, G G', which may be connected to form two closed circuits. The terminals $j\ k$ of the two sets or pairs of coils are connected, respectively, to the binding-posts E' F', and the other terminals, $h\ i$, are connected to a single binding-post, D'. To operate the motor, three line-wires are used to connect the terminals of the generator with those of the motor.

So far as the apparent action or mode of operation of this arrangement is concerned, the single wire D, which is, so to speak, a common return-wire for both circuits, may be regarded as two independent wires. In illustration, with the order of connection shown, coil B' of the generator is producing its maximum current and coil B its minimum; hence the current which passes through wire $e$, ring $b$, brush $b'$, line-wire E, terminal E', wire $j$, coils I I, wire or terminal D', line-wire D, brush $a'$, ring $a$, and wire $f$, fixes the polar line of the motor midway between the two coils I I; but as the coil B' moves from the position indicated it generates less current, while coil B, moving into the field, generates more. The current from coil B passes through the devices and wires designated by the letters $d$, $c$, $c'$, F, F', $k$, J J, $i$, D', D, $a'$, $a$, and $g$, and the position of the poles of the motor will be due to the resultant effect of the currents in the two sets of coils—that is, it will be advanced in proportion to the advance or forward movement of the armature coils. The movement of the generator-armature through one-quarter of a revolution will obviously bring coil B' into its neutral position and coil B into its position of maximum effect, and this shifts the poles ninety degrees, as they are fixed solely by coils B. This action is repeated for each quarter of a complete revolution.

When more than one motor or other device is employed, they may be run either in parallel or series. In Fig. 2 the former arrangement is shown. The electrical device is shown as a converter, L, constructed as I have described in my application Serial No. 258,787, filed December 23, 1887. The two sets of primary coils $p\ r$ are connected, respectively, to the mains F E, which are electrically connected with the two coils of the generator. The cross-circuit wires $l\ m$, making these connections, are then connected to the common return-wire D. The secondary coils $p'\ p''$ are in circuits $n\ o$, including, for example, incandescent lamps. Only one converter is shown entire in this figure, the others being illustrated diagrammatically.

When motors or converters are to be run in series, the two wires E F are led from the generator to the coils of the first motor or converter, then continued on to the next, and so on through the whole series, and are then joined to the single wire D, which completes both circuits through the generator. This is shown in Fig. 3, in which J I represent the two coils or sets of coils of the motors.

Obviously it is immaterial to the operation of the motor or equivalent device in Fig. 1 what order of connections is observed between the respective terminals of the generator or motor.

I have described the invention in its best and most practicable form of which I am aware; but there are other conditions under which it may be carried out. For example, in case the motor and generator each has three independent circuits, one terminal of each circuit is connected to a line-wire and the other three terminals to a common return-conductor. This arrangement will secure similar results to those attained with a generator and motor having but two independent circuits, as above described.

When applied to such machines and motors as have three or more induced circuits with a common electrical joint, the three or more terminals of the generator would be simply connected to those of the motor. Such forms of machines, when adapted in this manner to my system, I have, however, found to be less efficient than the others.

The invention is applicable to machines and motors of various types, and according to circumstances and conditions readily understood, with more or less efficient results. I do not therefore limit myself to any of the details of construction of the apparatus herein shown.

What I claim is—

1. The combination, with a generator having independent current-generating circuits and a converter or converters having independent and corresponding circuits, of independent conductors connecting one terminal of each generator-circuit with a corresponding terminal of the motor and a single conductor connecting the remaining generator and converter terminals, as set forth.

2. The combination, with a generator having independent current-generating circuits and a converter or converters having independent and corresponding circuits, of independent line or connecting circuits formed in part through a conductor common to all, as set forth.

3. The system of electrical distribution herein set forth, consisting of the combination, with an alternating-current generator having independent generating-circuits and electro-magnetic motors or converters provided with corresponding energizing-circuits, of line wires or conductors connecting the coils of the motors or converters, respectively, in series with one terminal of each circuit of the generator, and a single return wire or conductor connecting the said conductors with the other terminals of the generator, as set forth.

NIKOLA TESLA.

Witnesses:
ROBT. F. GAYLORD,
FRANK E. HARTLEY.